(12) United States Patent
Kokubu

(10) Patent No.: US 8,723,381 B2
(45) Date of Patent: *May 13, 2014

(54) ELECTRIC MOTOR

(71) Applicant: ASMO Co., Ltd., Kosai (JP)

(72) Inventor: Hiroshi Kokubu, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/803,624

(22) Filed: Mar. 14, 2013

(65) Prior Publication Data

US 2013/0193789 A1 Aug. 1, 2013

Related U.S. Application Data

(63) Continuation of application No. 12/923,045, filed on Aug. 31, 2010, now Pat. No. 8,421,300.

(30) Foreign Application Priority Data

Sep. 10, 2009 (JP) ................................. 2009-209352

(51) Int. Cl.
*H02K 5/22* (2006.01)
*H02K 11/00* (2006.01)

(52) U.S. Cl.
USPC ................................ 310/71; 310/83; 310/239

(58) Field of Classification Search
USPC ........ 310/71, 75 R, 83, 89, 91, 238, 239, 242
See application file for complete search history.

(56) References Cited

U.S. PATENT DOCUMENTS

| | | | | |
|---|---|---|---|---|
| 5,066,878 A | * | 11/1991 | Sekine et al. | 310/68 C |
| 6,242,824 B1 | * | 6/2001 | Torii et al. | 310/420 |
| 6,573,625 B2 | * | 6/2003 | Shimizu et al. | 310/71 |
| 7,109,617 B2 | * | 9/2006 | Mizutani et al. | 310/71 |
| 7,187,095 B2 | * | 3/2007 | Kokubu et al. | 310/75 R |
| 7,298,062 B2 | * | 11/2007 | Kokubu et al. | 310/75 R |
| 8,421,300 B2 | * | 4/2013 | Kokubu | 310/239 |
| 2005/0184606 A1 | * | 8/2005 | Kokubu et al. | 310/75 R |
| 2007/0120431 A1 | * | 5/2007 | Kokubu et al. | 310/75 R |
| 2008/0203833 A1 | | 8/2008 | Mizutani | |
| 2008/0203836 A1 | * | 8/2008 | Mizutani | 310/83 |

FOREIGN PATENT DOCUMENTS

JP  2009-11076 A  1/2009

* cited by examiner

*Primary Examiner* — Tran Nguyen
(74) *Attorney, Agent, or Firm* — Posz Law Group, PLC

(57) ABSTRACT

A brush holder is placed between a yoke housing and a gear housing and includes a holder member and a base member. The holder member is installed to an opening of the yoke housing and holds a plurality of brushes. The base member is installed to the holder member and includes a connector configured to connect with an external connector to receive an electric power. An output side end part of the yoke housing has a flange portion, through which the gear housing is fixed to the yoke housing. The holder member includes a contact portion that contacts an opening end portion of the yoke housing in an axial direction of a rotatable shaft. The contact portion is axially spaced from the base member by an axial gap.

8 Claims, 7 Drawing Sheets

ELECTRIC MOTOR

CROSS REFERENCE TO RELATED APPLICATION

This application is a continuation of application Ser. No. 12/923,045 filed on Aug. 31, 2010 entitled "ELECTRIC MOTOR", which is based upon and claims the benefit of Japanese Patent Application No. 2009-209352 filed on Sep. 10, 2009, the contents of which are incorporated herein by reference.

TECHNICAL FIELD

The present disclosure relates to an electric motor.

BACKGROUND

In some electric motors, a brush holder is placed between a motor main body side housing (a yoke housing) and a speed reducer side housing (gear housing). The brush holder includes a holder member and a base member. The holder member holds brushes. The base member includes a connector and is installed to the holder member. One such a motor is disclosed in Japanese Unexamined Patent Publication No. 2009-011076A. In this type of motor, in order to install the brush holder to the yoke housing, a positioning structure needs to be provided to axially position the holder member relative to the yoke housing. In the case of Japanese Unexamined Patent Publication No. 2009-011076A, an abutting portion (referred as a stepped portion in this Japanese Unexamined Patent Publication) is formed in an inner peripheral wall of the yoke housing. One axial side part of the holder member is axially abutted against the abutting portion, and the other axial side part of the holder member is axially abutted against the base member. In this way, the holder member is axially positioned.

However, in the case of the above-described motor, the abutting portion, which is formed in the yoke housing, adds a complexity to the structure of the yoke housing.

SUMMARY OF THE INVENTION

The present disclosure is made in view of the above disadvantage.

According to the present disclosure, there is provided an electric motor, which includes a yoke housing, a gear housing and a brush holder. The gear housing is formed separately from the yoke housing and is fixed to the yoke housing. The brush holder is placed between the yoke housing and the gear housing and includes a holder member and a base member. The holder member is installed to an opening of the yoke housing and holds a plurality of brushes. The base member is formed separately from the holder member and is installed to the holder member. The base member includes a connector configured to connect with an external connector to receive an electric power. An output side end part of the yoke housing has a flange portion, through which the gear housing is fixed to the yoke housing. The holder member includes a contact portion that contacts an opening end portion of the yoke housing in an axial direction of a rotatable shaft, which is rotatably received in the yoke housing. The contact portion is axially spaced from the base member by an axial gap.

The holder member may have a holder member side engaging portion. The base member may have a base member side engaging portion. The holder member and the base member may be configured to be installed together to one of the yoke housing and the gear housing in a temporal assembly state, in which the holder member side engaging portion and the base member side engaging portion are engaged with each other to hold the holder member and the base member together. The holder member side engaging portion and the base member side engaging portion may be disengaged from each other in a final assembly state, in which the holder member and the base member are held between the yoke housing and the gear housing upon fixing of the yoke housing and the gear housing together. The holder member side engaging portion and the base member side engaging portion may be snap-fitted together and thereby engaged with each other in the temporal assembly state.

BRIEF DESCRIPTION OF THE DRAWINGS

The present disclosure, together with additional objectives, features and advantages thereof, will be best understood from the following description, the appended claims and the accompanying drawings in which:

DETAILED DESCRIPTION

An embodiment of the present disclosure will be described with reference to the accompanying drawings.

Figure 1:
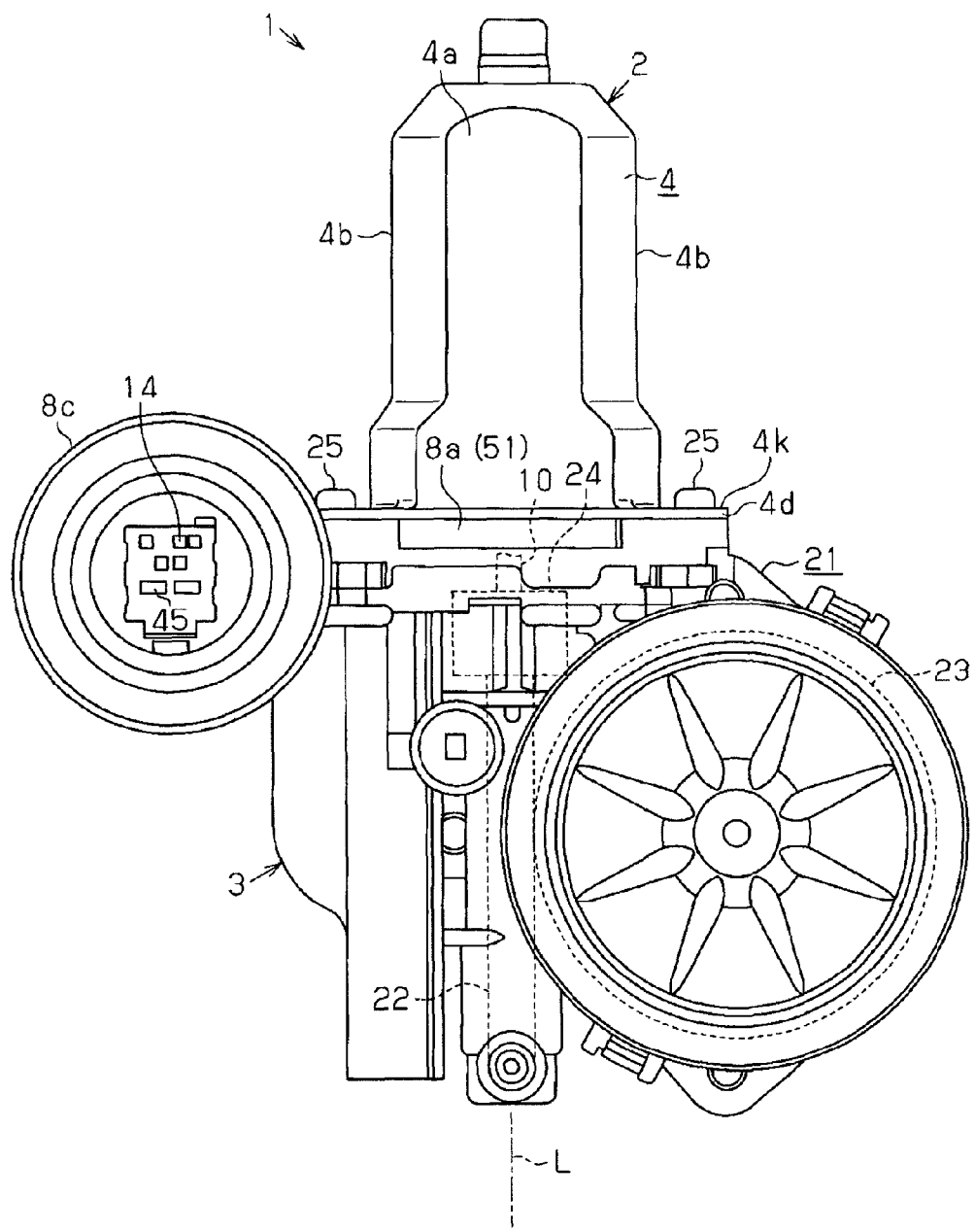
FIG. 1 is a side view of an electric motor according to an embodiment of the present disclosure.

A direct current (DC) motor 1 of the present embodiment shown in FIG. 1 is an electric motor, which is used as a drive source of a power window system installed in a vehicle. The DC motor 1 includes a motor main body 2 and a speed reducer 3.

Figures 2A, 2B:
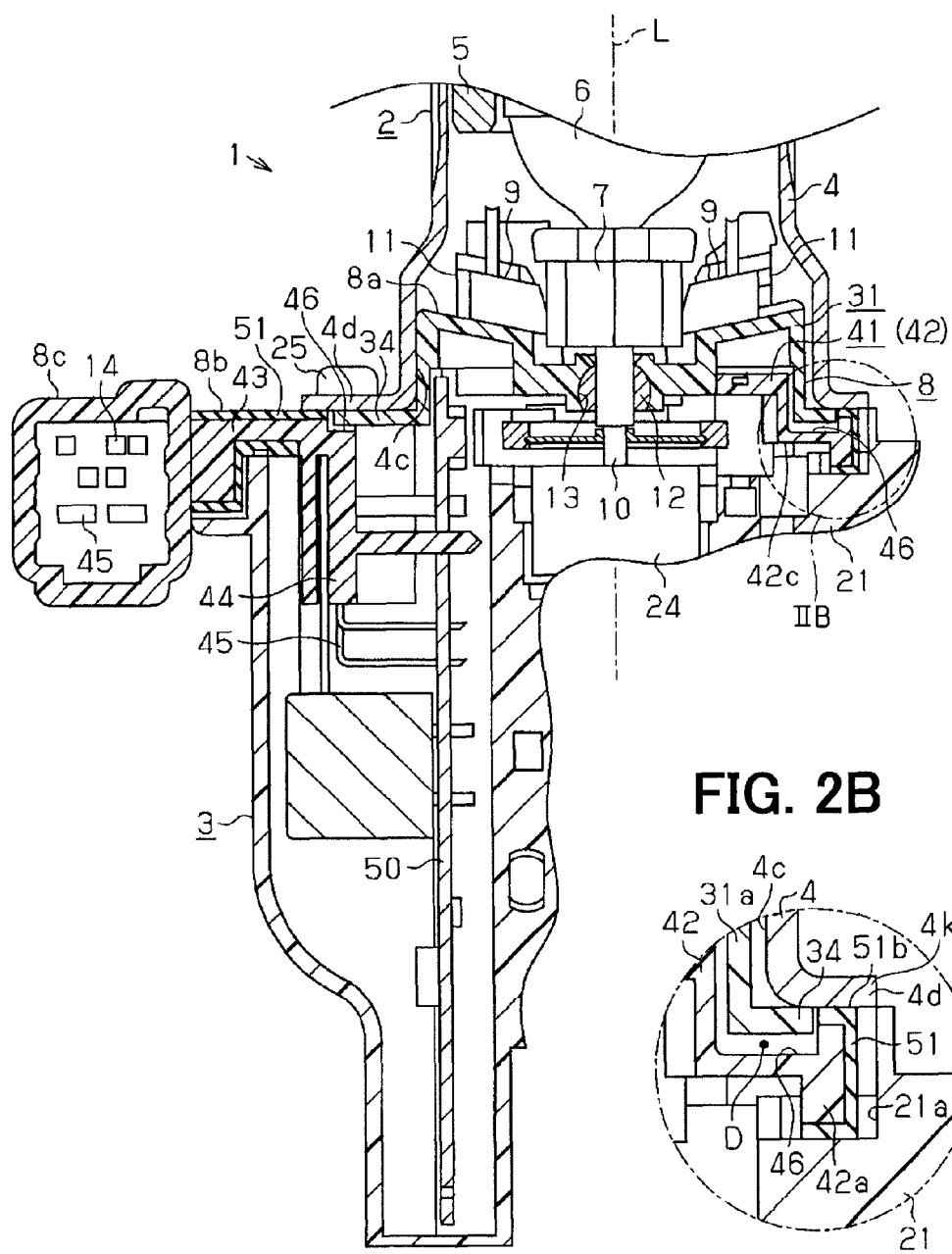
FIG. 2A is a partial cross-sectional view of the motor of the embodiment.
FIG. 2B is an enlarged view of a part of the motor indicated with a dot-dash circle IIB in FIG. 2A.

As shown in FIG. 2A, the motor main body 2 includes a yoke housing 4, two permanent magnets 5 (only one is shown in FIG. 2A), an armature 6, a commutator 7, a brush holder 8 and two brushes 9.

The yoke housing 4 is made of magnetic metal and is configured into a generally flat cup shaped body. Specifically, in the yoke housing 4, two planar surfaces 4a, which are generally parallel to each other, are joined together by two curved surfaces 4b, which are radially outwardly bulged away from each other. The two magnets 5 are fixed to interior surfaces, respectively, of the yoke housing 4, which are located inside of the curved surfaces 4b, respectively. The armature 6 is placed radially inward of the magnets 5. The armature 6 has a rotatable shaft 10. A base end part (a top end part in FIG. 2A) of the rotatable shaft 10 is rotatably supported by a bearing (not shown), which is held at a bottom center of the yoke housing 4. The commutator 7 is fixed to a distal end part of the rotatable shaft 10 at an opening 4c of the yoke housing 4.

A flange portion 4k is formed at the opening 4c of the yoke housing 4 to project radially outward from the opening 4c of the yoke housing 4 and surrounds the opening 4c of the yoke housing 4. The flange portion 4k includes two flange sections 4d, which extend radially outward (leftward and rightward, respectively, in FIG. 1) from the two curved surfaces 4b, respectively. The brush holder 8 is fixed to the opening 4c of the yoke housing 4.

The brush holder 8 includes a holder main body 8a, an extending portion 8b and a connector 8c. The holder main body 8a is configured into a form, which substantially covers the opening 4c of the yoke housing 4. Specifically, with reference to FIG. 3, in an imaginary plane generally perpendicular to an axis L of the rotatable shaft 10 or in a view taken in the axial direction of the axis L of the rotatable shaft 10, the holder main body 8a has two opposed parallel straight sides, which are generally parallel to each other and are generally straight, and these opposed parallel straight sides of the holder main body 8a are joined together by two opposed arcuate sides, which are radially outwardly bulged away from each other. A portion of the holder main body 8a is fitted into and is received in the yoke housing 4. The extending portion 8b outwardly extends from the holder main body 8a in a longitudinal direction of the holder main body 8a (in the left direction in FIG. 1 or FIG. 2A). The connector 8c is formed at a distal end part of the extending portion *b*.

As shown in FIG. 2A, the holder main body 8a includes two brush holding portions 11 and a bearing holding portion 13. The two brush holding portions 11 slidably hold the two brushes 9, respectively. The bearing holding portion 13 holds a bearing 12. The holder main body 8a also holds electric components, such as a choke coil, a circuit breaker and the like (not shown).

Figure 8:
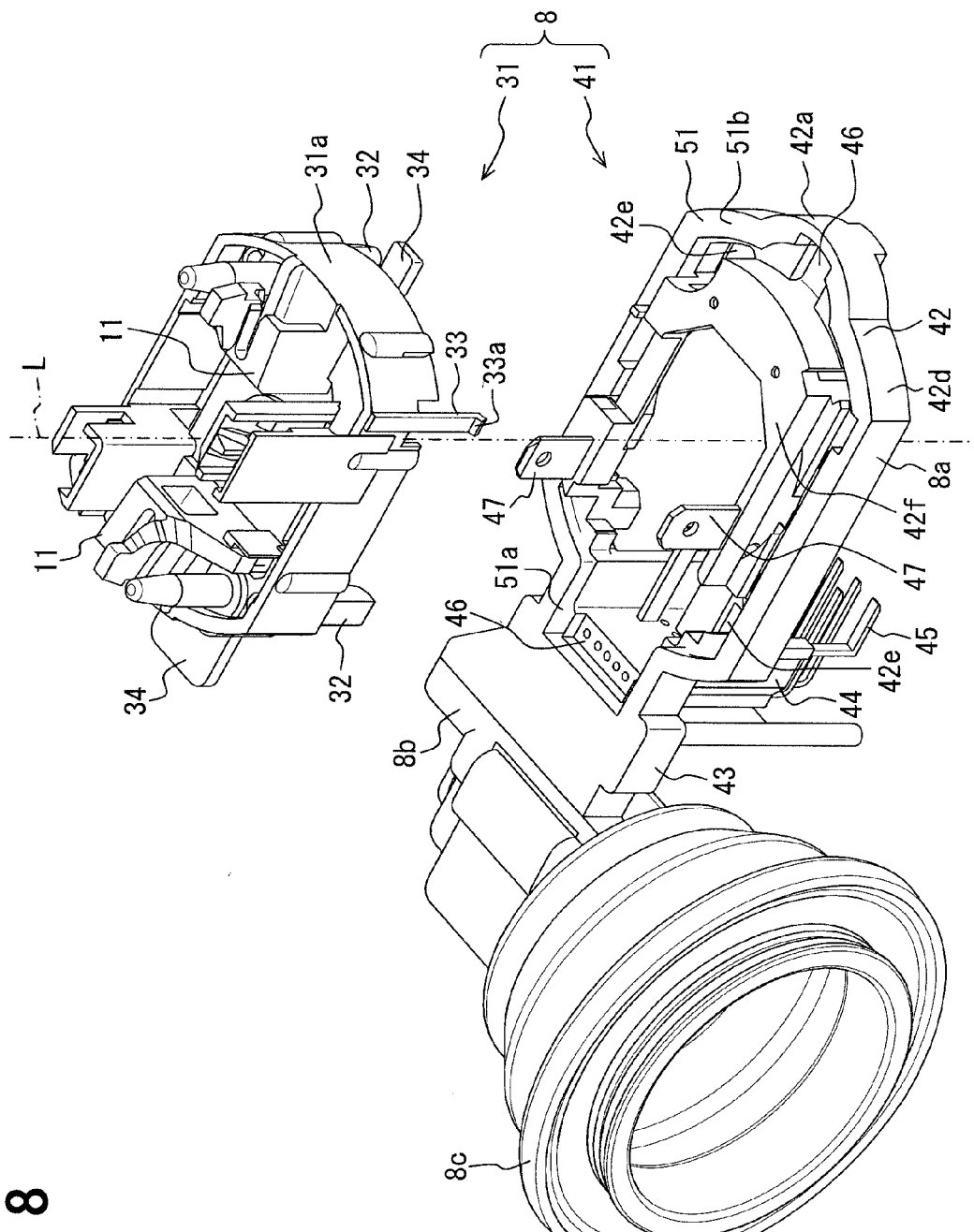
FIG. 8 is a perspective view showing the holder member and a base member of the embodiment.

Furthermore, the brush holder 8 holds terminals 14, which are electrically connected to the brushes 9 through terminals 47 (FIG. 8). The terminals 14 extend from the holder main body 8a to the connector 8c and are connectable with terminals of an external connector (not shown) to receive an electric power from an external power source (e.g., a battery). The distal end part of the rotatable shaft 10 (i.e., the part of rotatable shaft 10 located on the distal end side of the commutator 7, which is the lower side of the commutator 7 in FIG. 2A) is rotatably supported by the bearing 12 that is held by the bearing holding portion 13.

The speed reducer 3 includes a gear housing 21, a worm shaft 22, a worm wheel 23 and a clutch 24. In the present embodiment, the worm shaft 22 and the worm wheel 23 form a speed reducing mechanism, which reduces the rotational speed of the rotatable shaft 10.

The gear housing 21 is made of synthetic resin and is configured into a predetermined form to receive the worm shaft 22, the worm wheel 23 and the clutch 24 therein. The gear housing 21 has an opening 21a, which is opposed to the opening 4c of the yoke housing 4 in the axial direction. The brush holder 8 is clamped between the gear housing 21 and the yoke housing 4 in the axial direction, and the gear housing 21 and the yoke housing 4 are fixed together by screws 25. The screws 25 are received through screw holes 4e, 4f, 4g (FIG. 7) formed through the flange sections 4d and are threadably securely engaged with the gear housing 21 side parts, respectively (more specifically, nuts held by the gear housing 21), to fix the yoke housing 4 and the gear housing 21 together.

The worm shaft 22 is rotatably supported by bearings (not shown) provided in the gear housing 21 and is coupled with the rotatable shaft 10, which protrudes from the motor main body 2, through the clutch 24. The clutch 24 conducts a rotational drive force from the rotatable shaft 10 to the worm shaft 22. In contrast, the clutch 24 locks the rotation of the worm shaft 22 to limit conduction of a drive force from the worm shaft 22 to the rotatable shaft 10. That is, the clutch 24 is provided to limit the rotation of the DC motor 1 by a force applied from a load side (output shaft side).

The worm shaft 22 is meshed with the worm wheel 23. The worm wheel 23 is coupled with the output shaft (not shown), which extends in a direction generally perpendicular to the axis of the worm shaft 22. The output shaft is coupled with and drives a known wire type regulator, which raises or lowers a window glass (e.g., a door window glass) of the vehicle. When the output shaft (and thereby the worm wheel 23) is rotated, the regulator is driven to raise or lower the window glass.

Next, the structure of the brush holder 8 of the present embodiment will be described in detail.

The brush holder 8 includes a holder member 31 (FIGS. 4A, 4B and 8) made of synthetic resin, a base member 41 (FIGS. 3 and 8) made of synthetic resin and a seal member 51 made of an elastic material (e.g., elastomer).

With reference to FIGS. 3 to 4B and 8, the holder member 31 forms a part of the holder main body 8a. The holder member 31 is configured into a form, which substantially covers the opening 4c of the yoke housing 4. Specifically, with reference to FIG. 4B, in the imaginary plane generally perpendicular to the axis L of the rotatable shaft 10 or in the view taken in the axial direction of the axis L of the rotatable shaft 10, the holder member 31 has two opposed parallel straight sides, which are generally parallel to each other and are generally straight, and these opposed parallel straight sides of the holder member 31 are joined together by two opposed arcuate sides, which are radially outwardly bulged away from each other. The holder member 31 is fitted into and is substantially received in the yoke housing 4 (see FIG. 7). The holder member 31 includes the brush holding portions 11, the bearing holding portion 13, two positioning stubs 32 (FIGS. 4A, 4B and 8) and two engaging claws (holder side engaging portions) 33 (FIGS. 4A, 4B, 6 and 8). The positioning stubs 32 serve as positioning portions (a positioning means). The holder member 31 also has other holding portions, which hold other components, respectively, such as the choke coil and the circuit breaker.

Figure 3:
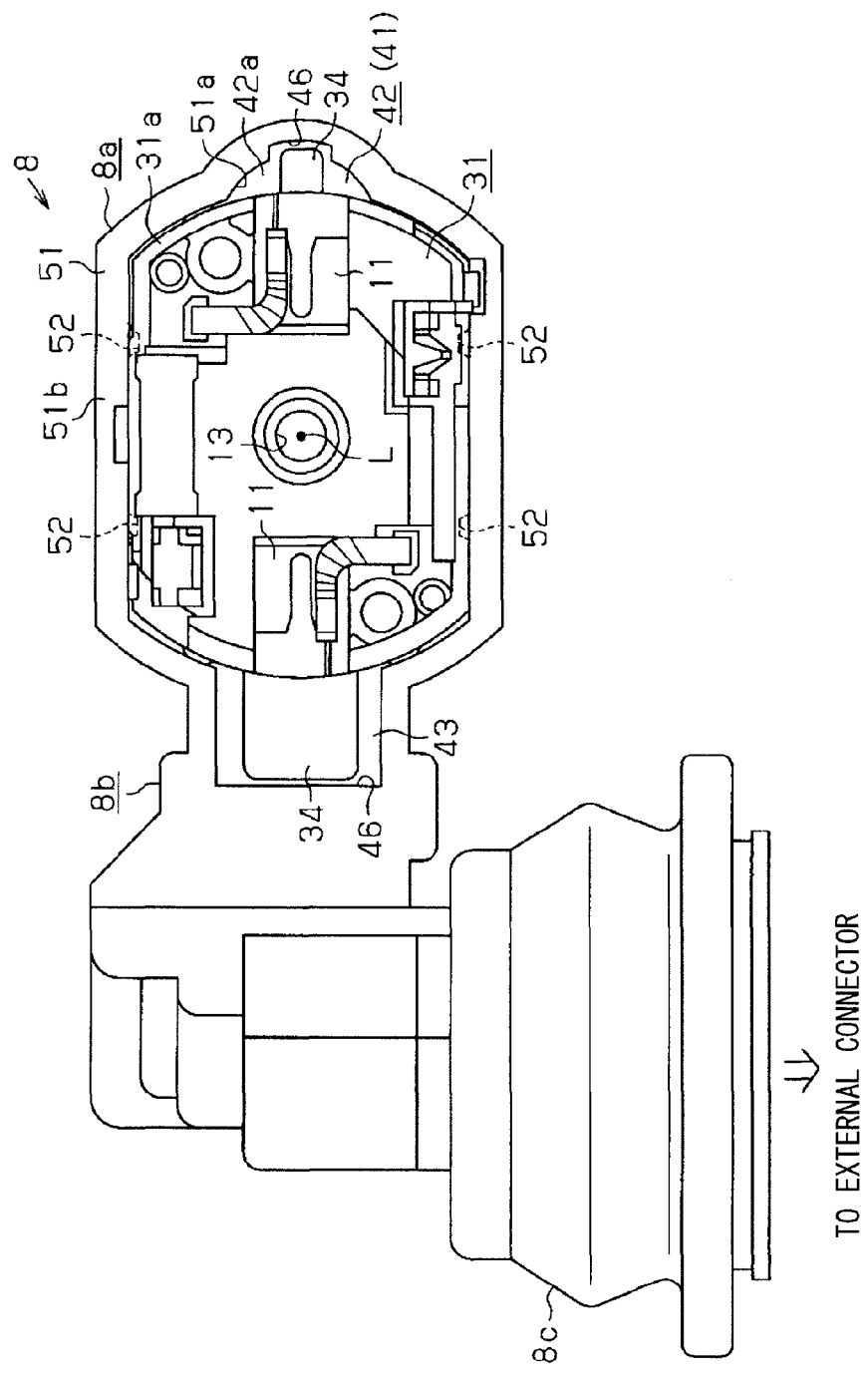
FIG. 3 is a plan view of a brush holder of the motor of the embodiment.
Figure 4A:
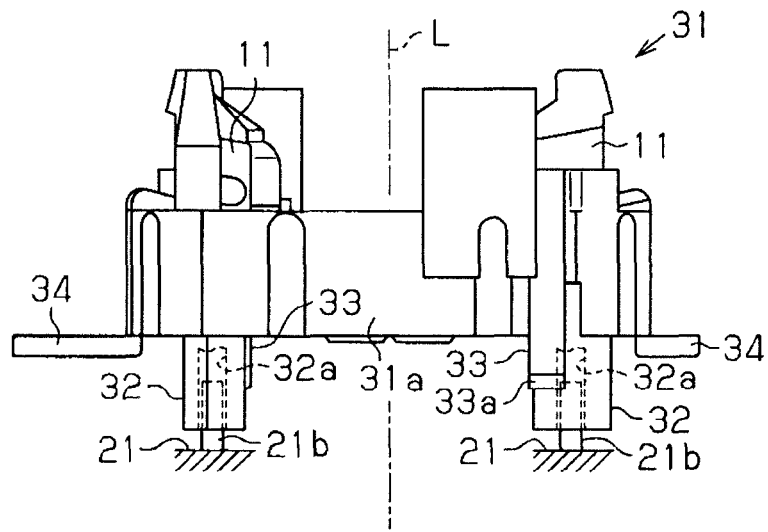
FIG. 4A is a partial side view showing a holder member installed to a gear housing of the motor while eliminating a base member, which is held between the holder member and the gear housing, for the sake of simplicity according to the embodiment.

As shown in FIGS. 3 and 8, the brush holding portions 11 are placed at opposed longitudinal end parts, respectively, of the holder member 31, which are opposed to each other in a longitudinal direction of the holder member 31 in the axial view of the holder member 31. Furthermore, in the axial view of the holder member 31, the brush holding portions 11 are placed at a widthwise center of the holder member 31, which is a center in a width direction, i.e., a direction perpendicular to the longitudinal direction of the holder member 31. Each brush holding portion 11 is configured into a generally quadrangular tube body, which has a hollow interior space extending therethrough generally in the radial direction. The brush 9 (FIG. 2A) of a generally quadrangular prism body is inserted into and is slidably held in each corresponding brush holding portion 11. The brushes 9 are not depicted in FIGS. 3 and 8 for the sake of simplicity.

The bearing holding portion 13 is formed in the center of the holder member 31 in the axial view of the holder member 31. The bearing holding portion 13 extends through the holder member 31 and holds the bearing 12 (FIG. 2A) at an inner peripheral surface of the bearing holding portion 13.

Figure 4B:
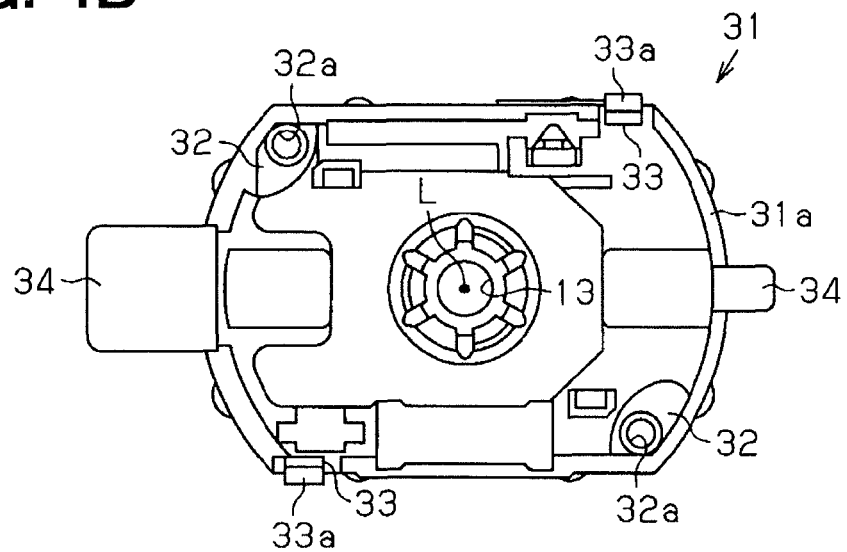
FIG. 4B is a plan view showing the holder member of the embodiment seen from a speed reducer side.

With reference to FIG. 4B, in the axial view of the holder member 31, one of the positioning stubs 32 is formed at one corner (upper left corner in FIG. 4B) of the holder member 31, and the other one of the positioning stubs 32 is formed at another corner (lower right corner in FIG. 4B) of the holder member 31, which is diagonally opposed to the one corner of the holder member 31. Each positioning stub 32 axially extends toward the gear housing 21 side and axially extends through a corresponding receiving hole 42e of the base member 41 (FIG. 8). A fitting hole 32a is formed to extend in the axial direction in a distal end part (lower end part in FIG. 4A) of each positioning stub 32. Two positioning projections (also being referred to as fitting projections or positioning portions and serving as a positioning means) 21b axially project from an inner surface of the gear housing 21 and are fitted into the fitting holes 32a, respectively, of the positioning stubs 32 in the axial direction. When the positioning projections 21b of the gear housing 21 are fitted into the fitting holes 32a, respectively, of the positioning stubs 32, the holder member 31 is positioned relative to the gear housing 21 in the direction perpendicular to the axial direction of the gear housing 21. Here, it should be noted that the base member 41, which is held between the holder member 31 and the gear housing 21, is not depicted in FIG. 4A for the sake of simplicity and ease of understanding.

Figure 6:
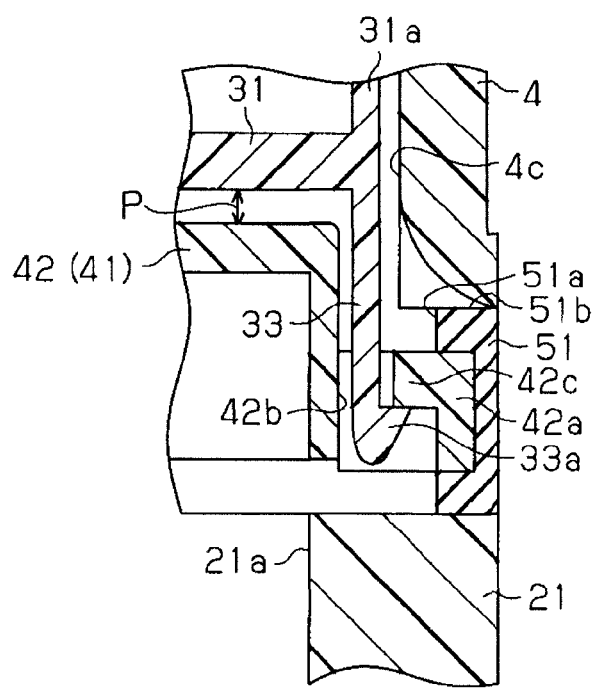
FIG. 6 is a partial enlarged cross-sectional view showing an engaging claw and an engaging hole according to the embodiment.

In the axial view of the holder member 31, one of the engaging claws 33 is formed at one longitudinal end part of one of the flat sides of the holder member 31, and the other one of the engaging claws 33 is formed at another longitudinal end part of the other one of the flat sides of the holder member 31, which is opposite from the one longitudinal end part of the one of the flat sides of the holder member 31 in the longitudinal direction of the holder member 31. The engaging claws 33 are symmetrically arranged about the axis L. Each engaging claw 33 axially extends toward the gear housing 21 side and has a claw tip (engaging tip) 33a at a distal end of the engaging claw 33 (FIGS. 6 and 8).

Two contact portions 34 project from the holder member 31 in the direction perpendicular to the axial direction (in the longitudinal direction of the holder member 31). As shown in FIGS. 2A and 8, the contact portions 34 extend from the opposed longitudinal end parts, respectively, of the holder member 31 in the longitudinal direction of the holder member 31, i.e., in the direction perpendicular to the axial direction at a lower end (gear housing 21 side end) side of the holder member 31. The contact portions 34 axially contact the flange sections 4d, respectively, of the yoke housing 4 (more specifically, opening end portions of the yoke housing 4, at which the opening 4c of the housing 4 is located and from which the flange sections 4d radially outwardly extend). In this way, the holder member 31 is axially positioned relative to the yoke housing 4.

Figure 7:
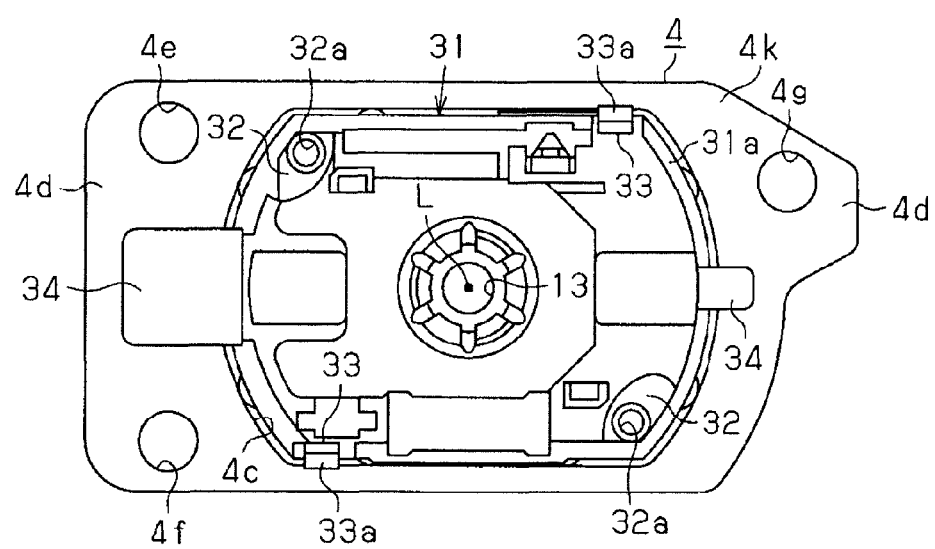
FIG. 7 is a plan view showing the yoke housing and the holder member according to the embodiment.

Furthermore, the contact portions 34 are formed at the arcuate sides, respectively, of the holder member 31 at the widthwise center of the holder member 31, which is the center in the width direction of the holder member 31. That is, the contact portions 34 are opposed to each other about the axis L, i.e., are circumferentially displaced from each other about the axis L by about 180 degrees. Furthermore, as shown in FIG. 7, one of the contact portions 34 (i.e., the contact portion 34 located on a base extension 43 side, i.e., a left side in FIG. 7) is placed between the screw holes (specifically, between the screw hole 4e and the screw hole 4f), into which the screws 25 are fitted to fix the yoke housing 4 and the gear housing 21 together. That is, this contact portion 34 is placed between the fixing portions (i.e., the screw hole 4e with the screw 25 and the screw hole 4f with the screw 25), which fix the yoke housing 4 and the gear housing 21 together.

The base member 41 includes a base body 42, the base extension 43 and the connector 8c. The base body 42 is configured into a form, which is similar to but slightly larger than that of the holder member 31, so that the base body 42 has two opposed parallel straight sides joined together by two opposed arcuate sides when the base body 42 is viewed in the axial direction. The base extension 43 forms a part of the extending portion 8b and extends further from the base body 42 in the longitudinal direction of the base body 42. The connector 8c is formed at a distal end part of the base extension 43 in the longitudinal direction of the base body 42.

The terminals 14 are buried in, i.e., are embedded in the interior of the base member 41 by insert molding. The terminals 14 extend from the connector 8c to the base body 42 through the base extension 43. The terminals 14 are electrically connected to the brushes 9 through the terminals 47 (FIG. 8) that project from a land 42f of the base body 42, which protrudes toward the holder member 31. The terminals 14 are also electrically connected to the other electric components provided in the holder member 31. Furthermore, as shown in FIG. 2A, the base member 41 has a holding portion 44, which holds a control circuit board 50 that controls rotation of the armature 6. Also, connection terminals 45, which are electrically connected to the control circuit board 50, are buried in the base member 41 by insert molding. The connection terminals 45 extend to the connector 8c through the base extension 43 and are connectable with the terminals of the external connector.

Figure 5:
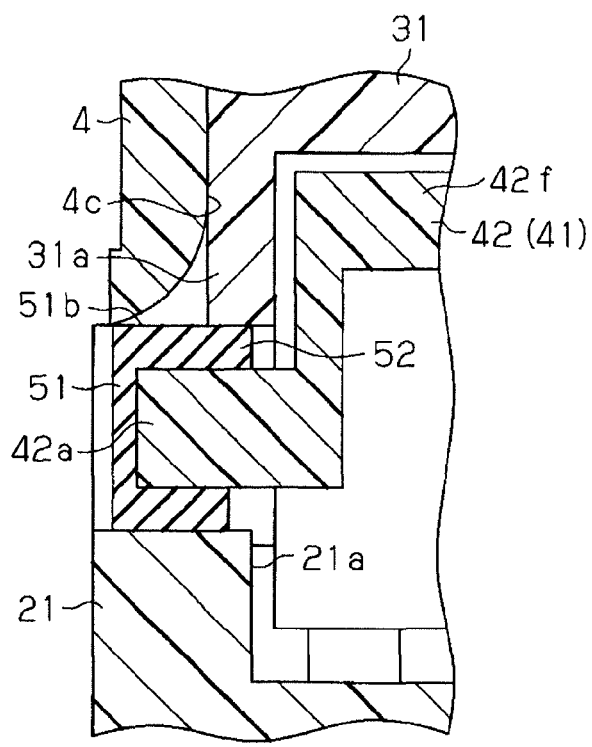
FIG. 5 is a partial enlarged cross-sectional view showing a clampable portion held between a yoke housing and the gear housing according to the embodiment.

The base body 42 further includes a flange portion 42a, which is located radially outward of the land 42f and surrounds the land 42f in an imaginary plane perpendicular to the axial direction. The flange portion 42a is stepped from the land 42f toward the gear housing 21 side, as shown in FIG. 5. The flange portion 42a further radially outwardly protrudes from an outer peripheral wall 31a of the holder member 31.

The seal member 51 is formed at an outer peripheral wall 42d of the flange portion 42a. A radially outer peripheral edge (a left edge in FIG. 5) of the seal member 51 is located radially outward of the outer peripheral wall 31a of the holder member 31, and the seal member 51 covers the outer peripheral wall 42d of the flange portion 42a. The seal member 51 surrounds the holder member 31 in the imaginary plane, which is perpendicular to the axial direction, and the contact portions 34 of the holder member 31 are placed radially inward of the seal member 51 in the imaginary plane (FIG. 2B). Furthermore, the outer peripheral wall 42d of the base body 42 is clamped between the yoke housing 4 and the gear housing 21 to place the seal member 51 in contact with both of the yoke housing 4 and the gear housing 21 in the axial direction. A portion of an inner surface 51a of the seal member 51, which is located on a holder member 31 side of the flange portion 42a in the imaginary plane perpendicular to the axial direction, is configured to coincide with the shape of the outer peripheral wall 31a of the holder member 31. The holder member 31 is loosely fitted to the inner surface 51a in a manner that enables the movement of the holder member 31 in the axial direction and in a direction perpendicular to the axial direction.

The seal member 51 is placed to also cover the base body 42 side end part of the base extension 43, which is located adjacent to the base body 42. The seal member 51 is formed integrally with the base member 41 such that the base member 41 serves as an insert component, a portion of which is inserted in the seal member 51. In the assembled state where the brush holder 8 (more specifically, the outer peripheral wall 42d of the flange portion 42a of the base body 42) is clamped between the yoke housing 4 and the gear housing 21, the seal member 51 is clamped between the yoke housing 4 and the gear housing 21 to seal between the base member 41 and the yoke housing 4 and between the base member 41 and the gear housing 21.

Clampable portions (serving as elastic members) 52 are formed in the seal member 51 (see FIGS. 3 and 5). Two of the clampable portions 52 are formed at each of two opposed parallel straight sides of the seal member 51 (more specifically, the two opposed parallel straight sides of the outer peripheral wall 42d), which correspond to the two opposed parallel straight sides, respectively, of the holder member 31, as shown in FIG. 3. With reference to FIG. 5, the clampable portions 52 are formed integrally with the seal member 51 to inwardly protrude from the inner surface 51a of the seal member 51 toward the holder member 31 side. The clampable portions 52 are axially clamped between the lower end part of the outer peripheral wall 31a of the holder member 31 and the flange portion 42a of the base body 42. The clampable portions 52 are axially placed and held in the compressed state between the holder member 31 and the flange portion 42a of the base body 42. An axial thickness of each of the clampable portions 52 is thinner than an axial thickness of the rest of the seal member 51.

As shown in FIG. 6, engaging holes 42b are formed in the base body 42 at locations, which respectively correspond to the locations of the engaging claws 33 of the holder member 31 to enable the installation of the holder member 31 to the base body 42. At the time of installing the holder member 31 to the base member 41, the engaging claws 33 are axially inserted into the engaging holes 42b, respectively, and the claw tips 33a of the engaging claws 33 are engaged with, i.e., are snap-fitted to stepped portions (base member side engaging portions) 42c, respectively, which are formed to radially inwardly project at the radially outer side surface parts, respectively, of the engaging holes 42b. In this way, the holder member 31 is temporarily fixed to, i.e., is temporarily assembled to the base member 41 in a temporal assembly state before the assembling of the yoke housing 4 and the gear housing 21 with each other (before a final assembly state), i.e., before the tightening of the screws 25. Thereby, it is possible to limit unintentional removal of the base member 41 from the holder member 31 in the assembling process. FIG. 6 shows the state before the assembling of the yoke housing 4 and the gear housing 21 together i.e., before the tightening of the screws 25. More specifically, FIG. 6 shows a relationship between the engaging claw 33 and the stepped portion 42c in the temporal assembly state (temporarily fixed state) of the holder member 31 and the base member 41.

With reference to FIGS. 2A and 3, two receiving recesses 46 are formed in the base body 42 at two locations, which correspond to the two contact portions 34, respectively, of the holder member 31. Each of the receiving recesses 46 receives the corresponding one of the contact portions 34. Each receiving recess 46 is formed by cutting, i.e., removing a portion of the inner surface 51a of the seal member 51, which is formed in the flange portion 42a of the base body 42 at the holder member 31 side, so that the thickness of the portion of the seal member 51 is reduced in FIG. 3. Specifically, each receiving recess 46 is formed in the inner side of the seal member 51 (the interior side of the seal member 51 where the interior of the gear housing 21 is located). Thus, the interior of the receiving recess 46, which receives the contact portion 34, is reliably sealed from the outside by the seal member 51. The receiving recess 46, which is located at the base extension 43 side, is formed by cutting, i.e., removing a portion of the seal member 51, which is formed in the base extension 43.

An axial bottom surface of the receiving recess 46, which is located at the side opposite from the base extension 43 in the longitudinal direction of the base body 42, is formed by the flange portion 42a (specifically, one longitudinal end section of the flange portion 42a located on the right side in FIG. 3) of the base body 42. An axial bottom surface of the other receiving recess 46, which is located at the side where the base extension 43 is placed, is formed by the flange portion 42a (specifically, the other longitudinal end section of the flange portion 42a located on the left side in FIG. 3) of the base body 42 and the base extension 43. A contact surface 51b of the seal member 51 contacts the flange portion 4k (including the flange sections 4d) of the yoke housing 4, and the bottom surface of each of these receiving recesses 46 is located on the axial side of the contact surface 51b where the gear housing 21 is located (the axial side opposite from the holder member 31). That is, each receiving recess 46 is axially recessed in the base body 42 in the direction away from the holder member 31. When each contact portion 34 of the holder member 31 is received in the corresponding receiving recess 46, an axial extent of the contact portion 34 overlaps with an axial extent of a portion of the seal member 51 in the axial direction. That is, the axial thickness of the contact portion 34 is absorbed by the receiving recess 46, i.e., the contact portion 34 does not axially protrude from the receiving recess 46 toward the corresponding flange section 4d. Therefore, it is possible to limit an increase in the size of the brush holder 8 and thereby the size of the entire motor 1.

At the brush holder 8 discussed above, in the temporal assembly state of the holder member 31 and the base member 41, which are temporarily assembled together by using the engaging claws 33 before the assembling of the yoke housing 4 and the gear housing 21 together by tightening of the screws 25, each clampable portion 52 of the seal member 51 is not axially substantially compressed by the holder member 31 and the flange portion 42a, and an axial length of each engaging claw 33 is set such that a play P (FIG. 6) is axially provided between the base member 41 and the holder member 31. Unlike the present embodiment, in a case where the play is not axially provided between the base member 41 and the holder member 31 in the temporal assembly state, it is necessary to engage each engaging claw 33 to the corresponding stepped portion 42c in the state where the clampable portions 52 are axially compressed between the holder member 31 and the flange portion 42a. In such a case, a substantial stress is always applied to the engaging claws 33 in the temporal assembly state, and the engaging claws 33 need to have a sufficient strength to compress the clampable portions 52. According to the present embodiment, the play P is axially provided between the base member 41 and the holder member 31 in the temporal assembly state. Therefore, the engaging claws 33 may be allowed to have a relatively low strength.

When the yoke housing 4 and the gear housing 21 are assembled together relative to the brush holder 8 in the temporal assembly state by tightening the screws 25, the seal member 51 of the base member 41 is axially compressed between the yoke housing 4 and the gear housing 21. At this time, the contact portions 34 of the holder member 31 contact the flange sections 4d, respectively, of the yoke housing 4 (more specifically, the opening end portions of the yoke housing 4, at which the opening 4c of the housing 4 is located). Therefore, the contact portions 34 of the holder member 31 receive the axial urging force from the flange sections 4d of the yoke housing 4 (more specifically, the opening end portions of the yoke housing 4), and thereby the holder member 31 is slightly pressed into the base body 42 in the axial direction. Thus, the holder member 31 and the flange portion 42a axially compress the clampable portions 52 of the seal member 51. In this way, the holder member 31 is axially elastically clamped between the yoke housing 4 and the clampable portions 52 of the seal member 51. Therefore, the holder member 31 and the base member 41 can be easily assembled together without increasing the dimensional accuracy of the holder member 31 and the base member 41 while the holder member 31 is positioned without having an axial rattling movement thereof.

In the final assembly state of the yoke housing 4 and the gear housing 21, the claw tips 33a of the engaging claws 33 are disengaged from, i.e., are spaced away from the stepped portions 42c, respectively, of the base body 42, and an axial gap D is provided between the flange portion 42a and the holder member 31, which includes the contact portion 34 (FIGS. 2A and 2B). That is, the contact portion 34 of the holder member 31 is axially spaced from the flange portion 42a by the axial gap D and thereby does not contact with the flange portion 42a in the receiving recess 46. Furthermore, the size of the holder member 31 is set with reference to the contact surface between the contact portion 34 of the holder member 31 and the corresponding flange section 4d of the yoke housing 4. Therefore, unlike the prior art technique, it is not required to form the positioning structure, such as the abutting portion, in the yoke housing 4. Thereby, according to the present embodiment, the positioning structure, which axially positions the holder member 31, can be easily implemented at the low costs.

Next, advantages of the present embodiment will be described.

(1) According to the present embodiment, the brush holder 8, which is placed between the yoke housing 4 and the gear housing 21, includes the holder member 31 and the base member 41. The holder member 31 is installed to the opening 4c of the yoke housing 4 and holds the brushes 9. The base member 41 includes the connector 8c and is installed to the holder member 31. The flange portion 4k, which includes the flange sections 4d, is formed at the output side end part (the axial end part at the opening 4c) of the yoke housing 4, and the gear housing 21 is fixed to the yoke housing 4 through the flange sections 4d. The holder member 31 has the contact portions 34, which contact the flange sections 4d, respectively, of the yoke housing 4 (more specifically, the opening end portions of the yoke housing 4) in the axial direction of the rotatable shaft 10. Thereby, when the contact portions 34 of the holder member 31 contact the flange sections 4d, respectively, of the yoke housing 4 (more specifically, the opening end portions of the yoke housing 4), the holder member 31 is positioned relative to the yoke housing 4 in the axial direction of the rotatable shaft 10. Therefore, it is not required to form the positioning structure, such as the abutting portion, which positions the holder member 31 relative to the yoke housing 4, in the interior of the yoke housing 4. Therefore, the yoke housing 4 can be easily manufactured while enabling the positioning of the holder member 31 relative to the yoke housing 4.

(2) In the present embodiment, the holder member 31 is loosely fitted to the base member 41 in both of the axial direction of the rotatable shaft 10 and the direction perpendicular to the axial direction. In other words, relative movement between the holder member 31 and the base member 41 in both of the axial direction and the direction perpendicular to the axial direction is enabled. Particularly, the base member 41 is displaceable relative to the holder member 31 in both of the axial direction and the direction perpendicular to the axial direction. This is made possible by the presence of the seal member 51 (and the clampable portions 52) made of the elastic material, which covers the base member 41. The elastic seal member 51 (and the clampable portions 52) enables the relative movement of the base member 41 relative to the holder member 31 even in the final assembly state, in which the yoke housing 4 and the gear housing 21 are securely held together by the tightening of the screws 25. Because of the above discussed loose fitting between the holder member 31 and the base member 41, the holder member 31 and the base member 41 can be easily assembled together without requiring the increase in the size accuracy of the holder member 31 and the base member 41.

(3) In the present embodiment, the base member 41 includes the receiving recesses 46, which receive the contact portions 34, respectively, of the holder member 31. Therefore, the axial thickness of each of the contact portions 34 can be absorbed by the corresponding receiving recess 46. As a result, the increase in the axial size of the motor 1 can be limited.

(4) In the present embodiment, the clampable portions 52 are provided between the holder member 31 and the base member 41 to serve as the elastic members being placed in the compressed state between the holder member 31 and the base member 41. Therefore, it is possible to limit the rattling between the holder member 31 and the base member 41 even in the temporal assembly state.

(5) In the present embodiment, the base member 41 has the seal member 51, which is configured into a closed oblong loop form (oblong annular form or closed oblong ring form) and contacts the flange portion 4k (including the flange sections 4d) of the yoke housing 4. Furthermore, the receiving recesses 46 are placed radially inward of the seal member 51. Therefore, it is possible to reliably seal the interior of the receiving recess 46 from the outside of the motor 1 by the seal member 51 to limit intrusion of rainwater, dust, sand or the like into the interior of the motor 1.

(6) In the present embodiment, the contact portions 34 are received in the receiving recesses 46, respectively, each of which is formed by cutting, i.e., removing the corresponding part of the inner peripheral portion (the inner surface 51a) of the seal member 51. Therefore, the size of each contact portion 34 in the direction perpendicular to the axial direction can be increased while implementing the sufficient seal performance of the seal member 51.

(7) In the present embodiment, the clampable portions 52 are formed integrally with the seal member 51. Therefore, it is possible to minimize the number of the components and the number of the assembling steps.

(8) In the present embodiment, the contact portions 34, the number of which is at least two, are provided about the axis L of the rotatable shaft 10. Therefore, it is possible to position the holder member 31 relative to the yoke housing 4 in good balance.

(9) In the present embodiment, the fixing portions (the screws 25 and the screw holes 4e to 4g), which fix between the yoke housing 4 and the gear housing 21, are provided at the at least three locations. Furthermore, one of the contact portions 34 is provided between the fixing portions (specifically between the screw hole 4e and the screw hole 4f). Therefore, the holder member 31 can be stably held between the yoke housing 4 and the gear housing 21. Thus, the positioning of the contact portion 34 of the holder member 31 can be reliably maintained.

(10) In the present embodiment, the positioning stubs 32 are provided in the holder member 31, and the positioning projections 21*b* are provided in the gear housing 21. The fitting hole 32*a* of each of the positioning stubs 32 receives the corresponding projection 21*b* in the axial direction, so that the inner peripheral surface of each of the positioning stubs 32 is engaged with, i.e., contact the corresponding positioning projection 21*b* in the direction perpendicular to the axial direction. Therefore, regardless of the size error (dimensional error) of the base member 41, the position of the holder member 31 relative to the gear housing 21 can be made constant by the positioning stubs 32 and the positioning projections 21*b*. Thus, the positions of the brushes 9, which are held by the holder member 31, can be made generally constant relative to the yoke housing 4 and the gear housing 21.

The above embodiment of the present disclosure may be modified as follows.

The shapes, the number and/or the locations of the contact portions 34 discussed in the above embodiment may be modified in any appropriate one(s) depending on the intended construction of the motor. For instance, the number of the contact portions 34 may be reduced to one or may be increased to three or more.

In the above embodiment, the clampable portions (serving as the elastic members) 52 are formed integrally with the seal member 51. Alternatively, the clampable portions 52 may be formed separately from the seal member 51. Furthermore, for example, the shapes and/or the number of the clampable portions may be modified to appropriate one(s) depending on the intended construction of the motor. For instance, the number of the clampable portions 52 may be reduced to three or smaller or may be increased to five or more.

In the above embodiment, the positioning projections 21*b* of the gear housing 21 and the positioning stubs 32 (the fitting holes 32*a*) are constructed as the positioning portions (the positioning means). Alternatively, recesses, which are formed in the inner surface of the gear housing 21, and the positioning stubs 32, which are received in these recesses, may be constructed as the positioning portions (the positioning means). The shapes and the number of the positioning stubs 32 (the fitting holes 32*a*) and of the positioning projections 21*b* may be modified to any appropriate one(s) depending on the intended construction of the motor. For instance, each of the number of the positioning stubs 32 and the number of the positioning projections 21*b* may be reduced to one or may be increased to three or more.

In the above embodiment, the yoke housing 4 and the gear housing 21 are fixed together by the screws 25. However, the present disclosure is not limited to this construction, and this construction may be modified to any appropriate one depending on the intended construction of the motor.

In the above embodiment, the present disclosure is implemented in the DC motor 1, which is used as the drive source of the power window system. Alternatively, the present disclosure may be implemented in a DC motor, which is used as a drive source of any other appropriate apparatus or system.

Additional advantages and modifications will readily occur to those skilled in the art. The present disclosure in its broader terms is therefore not limited to the specific details, representative apparatus, and illustrative examples shown and described.

What is claimed is:

1. An electric motor comprising:
    a yoke housing;
    a gear housing that is formed separately from the yoke housing and is fixed to the yoke housing; and
    a brush holder that is placed between the yoke housing and the gear housing and includes:
        a holder member that is installed to an opening of the yoke housing and holds a plurality of brushes; and
        a base member that is formed separately from the holder member and is installed to the holder member, wherein:
    the base member includes a connector configured to connect with an external connector to receive electric power;
    an output side end part of the yoke housing has a flange portion, through which the gear housing is fixed to the yoke housing;
    the holder member includes a contact portion that contacts an opening end portion of the yoke housing in an axial direction of a rotatable shaft that is rotatably received in the yoke housing; and
    the contact portion is axially spaced from the base member by an axial gap.

2. The electric motor according to claim 1, wherein the base member is displaceable relative to the holder member in the axial direction.

3. The electric motor according to claim 1, further comprising
    an elastic member that is placed in a compressed state between the holder member and the base member.

4. The electric motor according to claim 3, wherein:
    the base member has a seal member that is configured into a loop form and contacts the flange portion of the yoke housing; and
    the elastic member is formed integrally with the seal member.

5. The electric motor according to claim 1, wherein the contact portion is one of at least two contact portions that are opposed to each other about an axis of the rotatable shaft.

6. The electric motor according to claim 1, wherein:
    each of the holder member and the gear housing includes a positioning portion to position the holder member and the gear housing relative to each other; and
    the positioning portion of the holder member and the positioning portion of the gear housing are engaged with each other in a direction perpendicular to the axial direction.

7. The electric motor according to claim 1, wherein:
    the holder member has one of a fitting hole and a fitting projection that are fitted with each other in the axial direction; and
    the gear housing has the other one of the fitting hole and the fitting projection.

8. The electric motor according to claim 1, wherein:
    the yoke housing receives an armature, through which the rotatable shaft extends to rotate integrally with the armature;
    a commutator is fixed to the rotatable shaft on a distal end side of the armature to rotate integrally with the rotatable shaft;
    the plurality of brushes slidably contact the commutator;
    the gear housing receives a worm shaft and a worm wheel that are meshed with each other; and
    the worm shaft is rotated upon receiving a rotational drive force from the rotatable shaft to rotate the worm wheel.

* * * * *